(12) United States Patent
Frehe et al.

(10) Patent No.: US 11,834,376 B2
(45) Date of Patent: Dec. 5, 2023

(54) METHOD FOR PRODUCING FIREPROOF MATERIALS BASED ON SODIUM SILICATE

(71) Applicant: Cuylits Holding GmbH, Bersenbrück (DE)

(72) Inventors: Dirk Frehe, Ibbenbüren (DE); Heike Huth, Borken (DE)

(*) Notice: Subject to any disclaimer, the term of this patent is extended or adjusted under 35 U.S.C. 154(b) by 561 days.

(21) Appl. No.: 16/650,464

(22) PCT Filed: Oct. 1, 2018

(86) PCT No.: PCT/EP2018/076587
§ 371 (c)(1),
(2) Date: Mar. 25, 2020

(87) PCT Pub. No.: WO2019/129398
PCT Pub. Date: Jul. 4, 2019

(65) Prior Publication Data
US 2020/0239367 A1    Jul. 30, 2020

(30) Foreign Application Priority Data

Dec. 29, 2017  (EP) .................................. 17211052
Sep. 29, 2018  (DE) ......................... 102017217453.6

(51) Int. Cl.
| | | |
|---|---|---|
| *C04B 28/26* | (2006.01) | |
| *C04B 20/10* | (2006.01) | |
| *C04B 40/06* | (2006.01) | |
| *E04B 1/94* | (2006.01) | |
| *C04B 111/00* | (2006.01) | |
| *C04B 111/28* | (2006.01) | |

(52) U.S. Cl.
CPC .......... *C04B 28/26* (2013.01); *C04B 20/1033* (2013.01); *C04B 40/0641* (2013.01); *E04B 1/94* (2013.01); *C04B 2111/00612* (2013.01); *C04B 2111/28* (2013.01)

(58) Field of Classification Search
None
See application file for complete search history.

(56) References Cited

U.S. PATENT DOCUMENTS

| | | |
|---|---|---|
| 5,035,951 A | 7/1991 | Dimanshteyn |
| 5,194,087 A | 3/1993 | Berg |

FOREIGN PATENT DOCUMENTS

| | | | |
|---|---|---|---|
| DE | 102012220176 A1 | 6/2013 | |
| EP | 2 457 976 A2 | 5/2012 | |
| EP | 2 871 169 A1 | 5/2015 | |
| EP | 2 571 829 B1 | 11/2018 | |
| EP | 2571829 B1 * | 11/2018 | ......... C04B 20/0032 |
| WO | 2011/144618 A1 | 11/2011 | |

OTHER PUBLICATIONS

International Search Report for PCT/EP2018/076587 dated Dec. 13, 2018, with English Translation 14 pages.
Espacenet bibliographic data for EP 2571829 published Nov. 28, 2018, 1 page.
Espacenet bibliographic data for WO 2011/144618 published Nov. 24, 2011, 1 page.
Spacenet bibliographic data for DE 102012220176 published Jun. 20, 2013, 2 pages.
Espacenet bibliographic data for EP 2457976 published May 30, 2012, 1 page.
Espacenet bibliographic data for EP 2871169 published May 13, 2015, 3 pages.

* cited by examiner

*Primary Examiner* — Jeffrey D Washville
(74) *Attorney, Agent, or Firm* — Sand, Sebolt & Wernow Co., LPA

(57) ABSTRACT

The present invention concerns a process for the production of a solid fire protection material. The composition for producing the fire protection material contains at least one water glass and microcapsules provided with propellant gas. The fire protection material is formed by expanding the microcapsules or by breaking the polymer material of the shell of the microcapsules by the influence of temperature or by adding an agent which breaks the shell of the microcapsules.

27 Claims, No Drawings

METHOD FOR PRODUCING FIREPROOF MATERIALS BASED ON SODIUM SILICATE

The present invention concerns a process for the production of fire protection materials based on water glass, and the use thereof.

Fire protection materials in the sense of the invention refers in this respect to materials which are (to a large extent) non-combustible, have a temperature-insulating or heat-insulating effect and thus provide heat or flame protection, and may even contribute to the prevention of fires, for example by releasing water.

The gas impermeability of fire protection materials may be desirable in specific situations because it both prevents the supply of oxygen to the source of the fire and suppresses the release of potentially hazardous combustion gases.

In order to allow better processing and application, fire protection materials generally have in addition to their structural durability, which they prefer to retain even at elevated temperatures, preferably a low density and a certain hardness. The structural durability, even at elevated temperatures, enables fire protection of specific, selected areas. The low density simplifies the transport as well as the attachment of these materials at the desired positions (for example on objects). The low density of fire protection materials also causes a small overall increase in weight of an object after the fire protection material has been attached. The hardness of fire protection materials facilitates processing (for example, cutting them into shapes of desired size and shape), transport, storage and attachment to objects. In addition to the subsequent cutting of fire protection materials, the direct production of fire protection materials in the desired shapes is also of interest, as the subsequent cutting step is not required.

Cutting in the sense of the invention refers to any form of processing, such as milling, cutting, etching or other processes familiar to the person skilled in the art to obtain a fire protection material of the desired size and shape.

Due to the various areas of use of fire protection materials, such as outdoors, a high degree of stability against the environmental conditions present at the place of use, such as temperature fluctuations, direct sunlight, wind, water or moisture, is essential for these materials. The requirements for fire protection materials vary depending on the place of use and therefore may differ.

Corresponding materials are used in various industry sectors, such as the construction industry, especially in preventive structural fire protection. But fire protection materials also have a potentially wide range of uses apart from fire protection, especially due to their temperature insulating properties. The areas of use of fire protection materials and materials for thermal insulation often overlap due to their very similar requirement profiles.

The areas of use with (high) temperature differences (outside of a fire), for which fire protection materials can also be used, are the metallurgy or the metal processing industry in general, and the thermal insulation of ovens in particular. Also the "usual" thermal insulation of buildings, as for example of houses, while maintaining the mentioned fire protection characteristics by fire protection materials is conceivable. Further fields of application are obvious for the person skilled in the art.

The development of improved fire protection materials is promoted and influenced by legal requirements as well as the usual market mechanisms. Therefore, the production of fire protection materials, which have the mentioned properties, should be as inexpensive, energy-efficient and simple as possible. The fire protection materials should also have a design that can be adjusted as individually as possible or easy processing to obtain the desired design. Furthermore, it should be possible to use preferably harmless, easily accessible and inexpensive raw materials.

The provision of fire protection materials and processes for their manufacture, which possess all or part of the above-mentioned properties or fulfil all or part of the above-mentioned requirements, is therefore obviously of great interest.

Foaming or expanding compositions are generally known in fire protection; they form a thick, relatively flame-resistant, insulating material. Water glass, for example, is suitable as part of such compositions, as it is also non-combustible and has a high water content. The swelling of the compositions can be achieved by adding gas, for example. The resulting moulded bodies can be used directly or after further processing as fire protection materials.

The term "foaming" or "swelling"—as used in the context of the present invention—refers to the mode of action of special materials which can be swelling and thus form an insulating body. A fine, uniform structure of this expanding mass is of particular interest in order to obtain a uniform and high protective effect over the entire area of the expanding mass. Any kind of cracks and larger cavities are not desired. Furthermore, an increase in volume is necessary, since in the absence of this or with only a minimal increase, the retained bodies generally have an inadmissibly high density. Accordingly, in the context of the present invention, a "bad expanded layer" or a "bad expansion behaviour" means that the increase in volume was not sufficient and/or the structure of the expanded body does not have a fine, uniform structure.

The use of water glass for the production of moulded parts for fire protection purposes is disclosed in many documents.

U.S. Pat. No. 5,194,087 discloses the manufacture of moulded bodies from compositions with at least one water glass. The use of microcapsules with propellant gas for manufacturing is not disclosed.

EP 2 571 829 discloses a process for the production of moulded bodies for fire protection materials from compositions consisting of at least two different sodium silicate glasses of specific viscosity. EP 2 571 829 further discloses the simultaneous use of microcapsules filled with propellant gas to swell this composition, the swelling taking place under the action of energy. The use of more energy-efficient methods of gas release and the advantage of swelling in a specific temperature range are not disclosed.

In the disclosed state of the art the water resistance and the structure of the obtained fire protection materials can be improved. The swelling behaviour of the disclosed compositions is partly suboptimal. Furthermore, the production processes are quite energy-intensive.

The purpose of this invention is to provide a process for the production of fire protection panels which fully or at least partially fulfil the above mentioned properties. In particular, the task of this invention is to provide a low-cost, low-energy, simple process for the production of fire protection materials of low density and good, uniform structure, which exhibit a certain hardness and water resistance.

These aspects are at least partially fulfilled by the procedure disclosed hereafter:

A method of producing a solid fire protection material, in particular in the form of a fire protection panel, characterised by the following method steps (1) and (2):

(1) providing a composition comprising at least one water glass and propellant-gas microcapsules having a propellant-gas core and a polymer material as a shell, the microcapsules containing at least 20 wt. % of propellant gas, based on the dry weight;

(2) swelling the microcapsules and/or breaking up the polymer material of the shell of the microcapsules by the addition of propylene carbonate;

or by the following process steps (1') and (2'):

(1') providing a composition comprising at least one potassium hydroxide glass and propellant-provided microcapsules having a propellant-provided core and a polymer material as a shell;

(2') swelling the microcapsules and/or breaking up the polymer material of the shell of the microcapsules by the action of temperature from 60 to below 90° C.

The term "solid fire protection material" used in the context of this invention refers to a solid material, as is clear from its use as a fire protection panel. This material is preferably not powdery, whereby the presence of a few powdery residues on the otherwise non-powdery and solid fire protection material is to be understood as solid material.

Temperatures below 90° C. in the sense of this patent specification means temperatures below 90° C., preferably below 89° C., further preferably below 88° C., further preferably below 87° C., further preferably below 86° C.

When the terms "fire-resistant materials" and "fire-resistant panels" are used in the following description, they refer to fire-resistant materials and panels manufactured by the above process, unless otherwise indicated.

Where the term "composition" is used in the following description, it refers to a composition according to the above procedure, unless otherwise stated.

If viscosities have been determined or stated within the scope of this invention, they were determined with a Haake Viscotester C, the L-version at 20° C. using spindles L3 or L2 at 100 rpm or 200 rpm and a measuring range between 20 and 60%. The parameters used in each case will be explained further in the course of the experiments. In general, the spindle and torque for determining viscosities are adjusted and selected by the "trial and error" method until a measuring range of 15-95%, preferably 20-60%, is obtained.

The colour of the fire protection material produced by the process according to the invention is preferably white.

In particular, this invention describes a process in which the polymer material of the shell of the microcapsules is broken up with the agent propylene carbonate.

For the purpose of the invention, propylene carbonate comprises both the pure isomers ((R)-propylene carbonate and (S)-propylene carbonate), as well as mixtures of these isomers (such as the racemate).

Process Steps

In the context of this application, a reference to process step (1) also includes process step (1') and vice versa, unless it is clearly evident from the respective factual context that the corresponding statement explicitly refers only to process step (1) or (1'). The same applies mutatis mutandis to process steps (2) and (2').

Process Step (1) or (1') Composition

Water Glasses

Water glass contains chemically and physically bound water which, in the event of fire, extracts heat from the source of the fire through the evaporation of this water. On the other hand, the swelling behaviour of water glass leads to a ceramic foam which acts as an isolator. The proportion of water in the water glass and also the swelling behaviour depend on the type of water glass (sodium, potassium water glass etc.) and on the respective molar or weight ratio ($SiO_2:K_2O$; $SiO_2:Na_2O$), whereby the use of at least two different water glasses in the swelling compositions often results in a more advantageous swelling pattern for the cooling effect, whereby a better insulating effect is achieved.

The composition according to the invention comprises at least one water glass.

Sodium Silicate

The composition contains at least one sodium silicate in one form or another. If only one sodium silicate glass is used, it preferably has the following properties:

(1) weight ratio of $SiO_2$ to $Na_2O$ equal to 2.30 to 3.80, preferably 3.00 to 3.60, more preferably 3.10 to 3.50

(2) density from 1300 to 1600 $kg/m^3$, preferably 1300 to 1500 $kg/m^3$, particularly preferably 1340 to 1380 $kg/m^3$; and (3) water content of 50 to 70 wt. %, preferably 60 to 65 wt. %, particularly preferably 63.2 to 64.8 wt %.

The use of two different types of water glass often proved to be advantageous for the swelling behaviour of the fire protection material obtained.

The composition therefore preferably contains at least two different sodium silicate glasses, the first sodium silicate glass having a viscosity of 1000 to 2400 mPa*s (20° C.) and the second sodium silicate glass having a viscosity of 75 to 250 mPa*s (20° C.).

The first sodium silicate glass, which has a viscosity of 1000 to 2400 mPa*s (20° C.), preferably has at least one other of the following properties:

(1) weight ratio of $SiO_2$ to $Na_2O$ equal to 2.30 to 2.60, preferably 2.32 to 2.56, more preferably 2.34 to 2.54;

(2) density of 1500 to 1600 $kg/m^3$, preferably 1520 to 1580 $kg/m^3$, particularly preferred 1540 to 1565 $kg/m^3$; and (3) water content of 50 to 55 wt. %, preferably 51 to 54 wt. %, particularly preferred 51.9 to 53.6 wt. %.

The viscosity of this glass is further preferably from 1200 to 2200 mPa*s (20° C.) and particularly preferably from 1400 to 2000 mPa*s (20° C.).

The second sodium silicate glass has a viscosity of 75 to 250 mPa*s (20° C.) and preferably has at least one more of the following characteristics:

(1) weight ratio of $SiO_2$ to $Na_2O$ equal to 2.80 to 3.80, preferably 3.00 to 3.60, more preferably 3.10 to 3.50;

(2) density of 1300 to 1500 $kg/m^3$, preferably 1330 to 1450 $kg/m^3$, particularly preferably 1365 to 1375 $kg/m^3$; and (3) water content of 55 to 70 wt. %, preferably 60 to 65 wt. %, particularly preferably 63.2 to 64.6 wt. %.

The viscosity of this glass is further preferably from 85 to 225 mPa*s (20° C.) and particularly preferably from 100 to 200 mPa*s (20° C.).

For example, as sodium silicate glasses, a sodium silicate glass with a weight ratio of 2.3 can be used as the first sodium silicate glass and a sodium silicate glass with a weight ratio of 3.3 as the second sodium silicate glass. The ratio of the two water glasses can preferably be between 120-200 parts by weight of a sodium water glass with a weight ratio of 2.3 to 10-50 parts by weight of a sodium water glass with a weight ratio of 3.3, particularly preferably 140-180 parts by weight to 15-40 parts by weight, particularly preferably 155-165 parts by weight to 20-30 parts by weight.

In the composition, the content of water glasses, in particular sodium silicate glasses, in each case based on the total mass of the composition, is generally 60 to 98 wt. %, preferably 70 to 97 wt. %, more preferably 80 to 96 wt. %.

Potassium Water Glass

Surprisingly, it was found that the use of at least one potassium water glass in the composition has a positive effect on the water resistance of the fire protection materials obtained by the process according to the invention.

Therefore, the composition preferably comprises a potassium water glass.

The use of at least one potassium water glass in compositions in which the gas release in process step (2) by addition of a further agent often also has an influence on the kinetics of the gas release. For example, after the addition of the agent, an earlier (or later) gas release can occur and/or the total duration of the period in which gas release occurs can be shortened (or extended). For example, an earlier gas release often occurs when using propylene carbonate as a gas release agent in the presence of potassium silicate. This influence on the kinetics of gas release can be advantageous, disadvantageous or irrelevant (depending on the situation).

It is therefore necessary to evaluate both aspects—a potential influence on the kinetics of gas release and a higher water resistance of the resulting fire protection materials. Such a balancing has to be carried out by a person skilled in the art. While the water resistance is strongly dependent on the intended use and the place of utilization of the resulting fire protection material, the duration of the gas release and the time interval until the gas release are determined by the production process applied.

If a potassium water glass is used, it preferably has the following properties: A viscosity of 10 to 200 mPa*s, preferably between 20 to 100 mPa*s; a weight ratio of $SiO_2$ to $K_2O$ of between 1.7 to 3.5, preferably between 1.9 to 2.5, a density of between 1200 to 1500 kg/m$^3$, preferably between 1250 to 1400 kg/m$^3$ and a water content of between 50 to 80 wt. %, preferably between 55 to 75 wt. %.

If a potassium water glass is used, the proportion of potassium water glass, relative to the total amount of water glasses, in particular relative to the total amount of potassium water glass and sodium water glass, is at least 30 wt. %, more preferably at least 40 wt. %, more preferably at least 50 wt. %, more preferably at least 55 wt. %, more preferably at least 60%, more preferably at least 65%, more preferably at least 70%, more preferably at least 75%, more preferably at least 80%, more preferably at least 85%, more preferably at least 90%, more preferably at least 95% by weight.

The use of potassium water glasses, in particular in the extent of the above quantities, is indicated in particular for the use of process steps (1') and (2').

Other Mixtures of Water Glasses

Further, additional water glasses or mixtures of water glasses can be used.

In another preferred version, the composition contains at least one sodium silicate and at least one potassium water glass.

In this case, the sodium silicate preferably has the following properties:
  (1) weight ratio of $SiO_2$ to $Na_2O$ equal to 2.30 to 2.60, preferably 2.32 to 2.56, most preferably 2.34 to 2.54;
  (2) density of 1500 to 1600 kg/m$^3$, preferably 1520 to 1580 kg/m$^3$, most preferably 1540 to 1565 kg/m$^3$; and
  (3) water content of 50 to 55 wt. %, preferably 51 to 54 wt. %, particularly preferably 51.9 to 53.6 wt. %.
  (4) Viscosity from 1000 to 2400 mPa*s (20° C.), more preferably from 1200 to 2200 mPa*s (20° C.), particularly preferably from 1400 to 2000 mPa*s (20° C.).

The potassium water glass preferably has the following properties:
  (1) weight ratio of $SiO_2$ to $Na_2O$ equal to 2.80 to 3.80, preferably 3.00 to 3.60, particularly preferably 3.10 to 3.50;
  (2) density of 1300 to 1500 kg/m$^3$, preferably 1330 to 1450 kg/m$^3$, particularly preferably 1365 to 1375 kg/m$^3$; and
  (3) Water content of 55 to 70 wt. %, preferably 60 to 65 wt. %, particularly preferably 63.2 to 64.6 wt. %.
  (4) Viscosity from 75 to 250 mPa*s (20° C.), preferably from 85 to 225 mPa*s (20° C.) and particularly preferably from 100 to 200 mPa*s (20° C.).

Microcapsules

The composition comprises at least one propellant consisting of microcapsules provided with propellant gas.

By using this component, a very compact micro-foam with good thermal insulation properties is produced during foaming in process step (2) or (2'). The resulting foam is not as brittle as a pure water glass foam, which was produced without the use of appropriate microcapsules. A positive influence on the swelling volume is also often achieved when using such microcapsules.

The microcapsules provided with propellant gas, which serve as propellant, generally contain a propellant gas selected from the group consisting of hydrocarbons such as methane, ethane, propane, n-butane, isobutane, and pentanes such as n-pentane, iso-pentane and neopentane; chlorofluorocarbons, such as trichlorofluoromethane and dichlorodifluoromethane; dimethyl ether; carbon dioxide; nitrogen and air, and mixtures of these propellants.

In particular, the propellant comprises a hydrocarbon, in particular isobutane, isopentane or mixtures thereof.

The propellant can be used dry, as dispersion or with different degrees of drying. In one application form the microcapsule is a dispersion, in another application form the microcapsule is dried or available with different degrees of drying. In another form the microcapsule is partly dried and partly in a dispersion. Water is the main dispersing agent.

The microcapsules provided with propellant gas have a content of 2 to 35 wt. %, preferably 5 to 30 wt. %, more preferably 10 to 30 wt. %, even more preferably 20 to 30 wt. %, based on the dried microcapsule. In one version, the dried microcapsules have a content of at least 20 wt. % of propellant gas.

The outer shell of the microcapsules can be made of any polymer material as long as the material is able to enclose an appropriate propellant gas and expands when energy is supplied or ruptures when an agent is applied and releases this propellant gas.

Possible shell materials for the microcapsules used include copolymers, such as copolymers of acrylonitrile, methacrylate and/or acrylate, vinylidene chloride copolymers and vinylidene chloride-acrylonitrile copolymers.

The microcapsules provided with propellant gas generally have a content of shell material of 50 to 95 wt. %, preferably 50 to 90 wt. %, more preferably 60 to 90 wt. %, even more preferably 60 to 80 wt %, based on the dried microcapsules.

The microcapsules, which are provided with propellant gas, can also contain other ingredients such as magnesium hydroxide and/or silicates in the core and/or the shell material.

The microcapsules provided with propellant gas have such further ingredients, in each case referred to the dried microcapsule, in a content of 0 to 30 wt. %, preferably 0 to 25 wt. %, more preferably 0 to 20 wt. %, even more preferably 1 to 5 wt. %.

The microcapsules with propellant gas can have any average particle size. Average particle sizes are for example 1 to 90 µm, preferably 1 to 50 µm, further preferably 5 to 20 m, further preferably 10 to 16 µm.

The microcapsules provided with propellant gas generally have a density of $\leq 20$ kg/m$^3$, preferably $\leq 17$ kg/m$^3$, more preferably $\leq 14$ kg/m$^3$, even more preferably $\leq 12$ kg/m$^3$, relative to the dried microcapsules.

In the composition, the content of at least one propellant consisting of microcapsules provided with propellant gas is generally 0.5 to 15 wt. %, preferably 1.0 to 8.0 wt. %, more preferably 2.0 to 7.0 wt. %, each based on the total mass of the composition.

According to the invention, the mass ratio between water glass (or water glasses) and the microcapsules provided with propellant gas is 5.0 to 35.0, preferably 6.0 to 25.0, more preferably 8.0 to 24.0.

Appropriate propellants are commercially available. The different types of microcapsules differ in size, type of propellant, shell material, additives and propellant content. In the context of the present invention, different types of microcapsules can be used, whereby the type of microcapsule is adjusted to the other components and the swelling behaviour of the composition.

In the context of the present invention, the use of other propellants, such as azo compounds, which are expensive on the one hand and problematic and ecologically questionable in their handling on the other hand, is preferably avoided. The use of exfoliated graphite can also be dispensed with in the context of the present invention.

In one version the composition is free of exfoliated graphite. In another version, the composition is free of the usual blowing agents such as triazine derivatives. In a preferred version the composition is free of exfoliating graphite and triazine derivatives.

Other Components of the Composition

In the context of the present invention it was surprisingly discovered that the composition of the process step (1) or (1'), which has further components, is advantageous for the fire protection material obtained according to the process corresponding to the invention.

The Ceramization of the Composition at Elevated Temperatures Supporting Component These components can support the ceramization of the fire protection material already during the temperatures of the process according to the invention and/or develop this effect in case of fire.

A component which supports the ceramization of the composition at elevated temperatures is preferably selected from the group consisting of mineral additives, aluminum hydroxide, filter dust, fly ash, ceramic hollow spheres, hollow glass spheres, foam glass granules, slate powder, quartz powder, mica, wollastonite, calcium carbonates, kaolin, vermiculite and ettringite.

The use of aluminium hydroxide, vermiculites, hollow glass spheres, ceramic hollow spheres and calcium carbonate, as well as mixtures thereof, is particularly preferred.

The proportion by weight of this component which supports ceramization is generally 1 to 15 wt. %, preferably 3 to 13 wt. %, more preferably 6 to 12 wt. %, in each case based on the total mass of the composition.

Fibre

The composition preferably comprises at least one fibre. This fibre is preferably an organic fibre.

The use of a fibre reduces brittleness, making the fire protection material less susceptible to fracture.

The choice of an appropriate fibre improves the swelling behaviour of the composition as a whole. The resulting foam has finer pores and shows a better insulating effect.

Preferably, the at least one fibre is selected in a way that also supports plasticizing of the composition at elevated temperatures.

The at least one fibre is generally selected from the group consisting of polyalkylene fibres such as polyethylene fibres and polypropylene fibres; acrylic fibres; aramid fibres; polyamide fibres such as polyhexamethylene diadipamide fibres, polycaprolactam fibres and fibres of aromatic or partially aromatic polyamides; and fibres of partially aromatic or wholly aromatic polyesters and glass fibres.

The at least one fibre may be solid or hollow.

It is particularly preferred if the at least one fibre is a polyalkylene fibre, such as a polyethylene fibre or a polypropylene fibre. The use of a polyethylene fibre is particularly preferred.

The content of the at least one fibre is generally 0.1 to 4 wt. %, preferably 0.2 to 3 wt. %, further preferably 0.5 to 1.5 wt. %, based on the total mass of the composition.

The positive effects of using an organic fibre are also surprising, as the organic content of the fibre material actually incorporates a component that should accelerate the fire behaviour of the fire protection materials obtained. However, this is not the case and is achieved in particular by the small amount of fibre material.

The use of an appropriate fibre in the composition also increases the binding capacity to adjoining substrates or materials during the swelling process. This aspect is particularly relevant for composite materials.

Preferably the composition comprises at least one further component selected from the group consisting of at least one component supporting the ceramization of the composition at elevated temperatures; and/or at least one fibre.

Borax/Water Glass/Borax Hardener

A further preferred constituent of the composition is disodium tetraborate decahydrate (borax), the content of disodium tetraborate decahydrate, in each case based on the total mass of the composition, generally being 0.1 to 10 wt. %, preferably 0.25 to 7.5 wt. %, more preferably 0.5 to 5.0 wt. %

The composition may additionally comprise at least one further component which leads to hardening and/or settling of the composition.

The further component is generally selected from the group consisting of phosphate-containing water glass hardeners, glyoxal, triacetin, ethylene carbonate and propylene carbonate.

The content of a hardener, in each case based on the total mass of the composition, is generally 0.5 to 10 wt. %, preferably 1.0 to 7.5 wt. %, more preferably 2.0 to 5.0 wt. %.

Hygroscopic Component

The composition may additionally comprise at least one further component which has a moisture-retaining and/or hygroscopic property. By adding a corresponding component, the residual moisture of the fire protection material can be adjusted and kept constant.

This additional component is preferably selected from the group consisting of glycerol, Epsom salt (magnesium sulphate), calcium chloride, zeolites and sugar (also in the form of molasses). The use of Epsom salt is particularly advantageous, as the high proportion of crystal water has particularly positive properties on the cooling effect in the event of fire.

Other Additional Components

In addition, the composition may include at least one silicic acid.

Other components customary for swelling compositions may also be included in the composition.

The composition has a water content of generally 15 to 65 wt. %, preferably 20 to 55 wt. %, particularly preferably 25 to 50 wt. %, based on the total mass of the composition. This content of water in the composition can be realized by the special selection of the individual components or by adding water.

Through the addition of additional water it is also possible to achieve higher water contents, for example up to 95 wt. %.

The water content of the composition can be increased by adding substances with a high crystal water content such as ettringite. The addition of substances with a high vapour pressure such as glycerine can also reduce or prevent the mass from drying out. The addition of such substances also increases the residual moisture content of the fire protection material.

Process Step (2) or (2')—Swelling and/or Breaking Open the Microcapsules

In the process step (2) or (2'), the microcapsules are swelling and/or breaking open, thus causing the composition to swell. This results in a compact micro-foam with good thermal insulation properties, which is not brittle.

Surprisingly, it has been found that the expansion of the microcapsules in a temperature range below 90° C. results in particularly advantageous fire protection materials. This temperature range between 60 and below 90° C. is also preferred.

In one version, the microcapsules are swelling by the action of temperature from 65 to below 90° C., preferably from 70 to below 90° C., further preferably from 75 to below 90° C., further preferably from 80 to below 90° C., further preferably from 85 to below 90° C.

In another embodiment, the microcapsules are swelling by the action of temperature from 65 to below 80° C., preferably from 65 to below 75° C., further preferably from 65 to 70° C.

As an alternative to swelling of the microcapsules by temperature, it was discovered that specific agents also cause swelling of the composition by breaking the microcapsules. The agent includes single substances such as solvents, but also mixtures of several single substances.

The weight proportion of the agent in relation to the total mass of the composition generally amounts to 1 to 20 wt. %, preferably 2 to 15 wt. %, further preferably 3 to 10 wt. %.

The selection of this agent depends in particular on the microcapsules used. Breaking the microcapsules with an agent is obviously a more energy-saving method than swelling them with an energy supply. Thus, this procedure allows the use of lower process temperatures, e.g. room temperature, than the swelling by energy supply.

The microcapsules can be broken open in a variety of ways using an agent. Conceivable are, for example, a chemical reaction between the agent and the microcapsule, which results in the release of gas, or a physical interaction between the agent and the microcapsule, which causes, for example, the capsules to swell and thus release the propellant gas. Of course, further interactions to break the microcapsules are possible and an interaction of different interactions is not excluded.

In an embodiment of the invention, propylene carbonate or a mixture containing propylene carbonate is used as a gas releasing agent.

In particular for microcapsules which, in each case based on the dried microcapsule, have a content of 2 to 35 wt. %, preferably 5 to 30 wt. %, more preferably 10 to 30 wt. %, even more preferably 20 to 30 wt. % propellant gas, propylene carbonate or a mixture containing propylene carbonate is used as a gas-releasing agent.

In particular for microcapsules which, in each case based on the dried microcapsule, have a content of shell material of 50 to 95 wt. %, preferably 50 to 90 wt. %, more preferably 60 to 90 wt. %, even more preferably 60 to 80 wt. %, propylene carbonate or a mixture containing propylene carbonate is used as a gas-releasing agent.

The microcapsules, which are provided with propellant gas, can also contain other ingredients such as magnesium hydroxide and/or silicates in their core and/or shell material.

In particular for microcapsules which, in each case based on the dried microcapsule, contain further ingredients such as magnesium hydroxide and/or silicates in a content of 0 to 30 wt. %, preferably 0 to 25 wt %, more preferably 0 to 20 wt %, more preferably 1 to 5 wt. %, propylene carbonate or a mixture containing propylene carbonate is used as a gas-releasing agent.

Propylene carbonate or a mixture containing propylene carbonate is used as a gas-releasing agent, particularly in the case of microcapsules which, based on the dried microcapsule, have average particle sizes of, for example, 1 to 90 μm, preferably 1 to 50 μm, more preferably 5 to 20 μm, even more preferably 10 to 16 μm.

Especially for microcapsules, which generally have a density of $\leq 20$ kg/m$^3$, preferably of $\leq 17$ kg/m$^3$, more preferably of $\leq 14$ kg/m$^3$, even more preferably of $\leq 12$ kg/m$^3$, based on the dried microcapsule, propylene carbonate or a mixture containing propylene carbonate is used as a gas-releasing agent.

Preferably, the gas release starts after addition of the agent in a period of between 20 seconds and 20 minutes, further preferably between 20 seconds and 10 minutes, further preferably between 30 seconds and 5 minutes, further preferably between 1 minute and 3 minutes.

The resulting fire protection material is essentially structurally stable.

It generally has a density of less than 0.6 g/cm$^3$, preferably less than 0.5 g/cm$^3$, particularly preferably less than 0.4 g/cm$^3$.

If the composition is provided in a specific form in process step (1) or (1') and then undergoes process step (2) or (2'), the fire protection materials obtained can preferably be removed from this form without difficulty and essentially without residue and in a structurally stable manner. The mould used can then be reused without any complicated cleaning.

In contrast to the simple removal of the fire protection materials from the specific moulds, the production of composite materials presents a contrasting situation. Here, during the process step (2) or (2') the compositions are in contact with carrier materials or contact these carrier materials after the swelling. After the swelling, the fire protection material and the carrier materials form a solid composite material (or a composite body). The composition therefore has sufficient adhesive properties, so that preferably no additional adhesive materials have to be used in the production of composite materials. This aspect will be discussed further in the section on the processing of composite materials.

The shell of the microcapsules in process step (2) is broken open and/or swelled with propylene carbonate, preferably a mixture of propylene carbonate with other additives. For example, it is a mixture of propylene carbonate with dispersant and/or kaolin and/or fly ash and/or vermiculite and/or calcium carbonate. Other ingredients, especially those listed in the composition, may be part of these mixtures.

Use of the Fire Protection Materials

The fire protection materials obtained by the process according to the invention are used, for example, in the construction industry, such as in the cladding and/or covering of doors, walls, floors and ceilings, for breakthroughs, penetrations and other openings. In addition to building construction, and for example in the lining of tunnels and pipes, the fire protection materials can also be used in shipbuilding and vehicle construction, such as for wagons, or in the transport industry, such as for containers. They can also be used to protect cables and other electronics, and for personal protective clothing.

The fire protection materials according to the invention can be used, for example, to protect a "black box" or similarly sensitive electronics. A black box is a computer that is used, for example, in manned and/or unmanned air, land and water vehicles. Examples of aircraft are airplanes and helicopters. Examples of land vehicles are trains and cars. Examples of water vehicles are ships, boats and submarines. The black box records various parameters during operation, such as the speed and position of the vehicle, but can also be used to record other parameters, such as sounds, such as conversations. If required, the recorded data can be read out. This is of particular interest in the case of accidents, such as a plane crash, and/or almost accidents, in order to reconstruct the course of the accident and/or the cause of the accident using the recorded data.

Since extreme conditions often exist, especially in the case of accidents, the black box must be protected against such conditions. From an economic point of view, this protection should be as space-saving as possible and have a low density. The extreme conditions include high thermal energies, for example due to a fire, and high kinetic energies, such as in a high-speed impact. The black box may also have to be protected against various chemicals which, especially in the event of an accident, could contact the electronics of the black box and compromise the stored data, so that the data cannot be read or only be partially read out. Such chemicals include, for example, water, which contacts the black box, for example by extinguishing a fire or by leakage of a watercraft, but also other chemicals, for example other chemicals which can be used in firefighting, or chemicals which are released, for example by the high thermal energy of a fire.

The fire protection materials according to the invention are an ideal material for the protection of such a black box due to their low density, the fire protection properties and their water resistance, or it is advantageous to use the fire protection materials according to the invention in combination with other materials to protect a black box.

It is therefore a purpose of the present invention to design a housing for a data processing unit, such as a black box, with the fire protection material according to the invention in such a way that the most effective thermal insulation effect is achieved with the smallest possible space required.

This can be achieved with one or more, at least partially overlapping, invention-compliant fire protection materials which surround or are directly connected to the data processing unit, preferably completely. Completely surrounding in this sense comprises the presence of smaller junctions and/or the presence of at least one heat transfer element provided that the cross-sectional area of this heat transfer element and of the junctions is sufficiently small, i.e. substantially smaller than the area of the surrounding fire protection material. For example, the cross-sectional area of the heat transfer element and any seams present is less than 10%, preferably less than 5% and in particular less than 2% of the area of the surrounding fire protection material according to the invention.

In addition to the fire protection materials according to the invention, other materials such as vacuum insulation board materials can also be used. These usually consist of an open-porous support core surrounded by a shell that is as airtight as possible. The material for the supporting core can be, for example, open-porous plastic foams, pyrogenic silicas or perlite, each of which has a low thermal conductivity of, for example, less than 0.01 W m$^{-1}$ K$^{-1}$. The shell surrounding the supporting core consists, for example, of one or more layers of a metallized plastic film, each of these films being covered with one or more layers of a metal coating, for example an aluminium coating. In the support core or between the support core and the envelope, additional desiccants and/or binders may be incorporated which can bind penetrating gas molecules, for example water vapour.

To enable an enclosure consisting of as few segments as possible or with as few gaps or butt joints between segments as possible, it is optionally planned to form the enclosure from two half-shells, each of which consists of such vacuum insulation panel material.

In order to improve the thermal insulation, it is provided according to a design that between two wrappings of vacuum insulation board material or on at least one side of the vacuum insulation board material there is a further thermal insulation layer; this is preferably the fire protection material according to the invention.

Optionally, a thermal insulation layer of an aluminium layer is arranged on the inside of a housing wall. This aluminium layer can be a separately produced aluminium foil, which is subsequently arranged and fixed to the inside of the housing wall. It is also possible that the aluminium layer is applied to the inside of the enclosure wall as a multi-layer coating. In this case, the aluminium layer arranged on the inside of the housing acts as a comparatively poor heat radiator and emits only a small amount of heat into an interior of the housing. In order to achieve the highest possible mechanical load capacity and temperature resistance, the housing can have a housing wall made of metal, especially stainless steel, so that the housing wall has a comparatively high thermal conductivity. The aluminium layer on the inside of the housing wall prevents high thermal radiation into the interior of the housing and thus towards the data processing unit when the metallic housing wall heats up.

Additionally or alternatively, a thermal insulation layer of an aluminium layer can be arranged on the outside of a housing wall. The aluminium layer on the outside has a heat-reflecting effect and prevents rapid heating of the housing wall due to increased ambient temperatures.

Preferably, it is intended that a thermal insulation layer, preferably according to the invention, has a layer of aerogel. Such an aerogel is a highly porous solid body with a volume fraction of up to more than 99.9% of pores. Corresponding silicate-based aerogels are commercially available, but other materials can also be used, e.g. plastic-based or carbon-based. The pore size of common aerogels is in the nanometre range, whereas aerogels can have inner surfaces of up to 1000 m$^2$ per gram of solid. Due to these properties, aerogels generally have a very high thermal insulation effect and a very low density and are particularly suitable for use in addition to the fire protection materials, as protection for such a data processing unit or black box.

It is also possible that a thermal barrier coating, preferably a layer according to the invention, is a layer of a fleece, a mesh, a fabric or a scrim of ceramic or mineral fibres. Due to its high flexibility and easy deformability, such a thermal barrier layer can be adapted to the shape of the housing and in particular to the useful space available inside the housing around the data processing unit for the thermal barrier device.

The intumescent material described below may be a composition as described in relation to process step (1) or (1') of the fire protection material according to the invention.

According to one design, the thermal insulation layer according to the invention also comprises at least one layer of an intumescent material which expands when heated above a threshold temperature. This intumescent material then forms an additional insulating layer with a low thermal conductivity, whereby an undesired heat transfer through the thermal insulation layer can be further substantially reduced. In addition, this additional thermal insulation layer of the intumescent material can initially fill only a comparatively small portion of the interior of the housing, leaving "empty" spaces. These allow an effective heat exchange during regular operation. When heat from the environment exceeds the threshold value, the intumescent material then expands and at least partially fills the previously existing "empty" spaces, so that ideal thermal insulation is achieved.

In addition, the intumescent material can perform an endothermic reaction during such an expansion, whereby heat is "consumed" so that a cooling effect occurs.

Furthermore, the intumescent material can additionally or alternatively release or form a flame-retardant active ingredient in the case of temperature-related foaming. Corresponding active substances may be, for example, various flame retardants, for example halogenated compounds such as tetrabromobisphenol A or polybrominated diphenylethers, nitrogen-based flame retardants such as melamine or inorganic flame retardants such as aluminium hydroxide.

According to a design, the intumescent material is arranged on a heat-insulating carrier layer, whereby this carrier layer is preferably a layer according to the invention. Due to the use of this separate carrier layer, the intumescent material does not have to be arranged or applied on the inside of the case wall or directly on the data processing unit. By the arrangement and orientation of the carrier layer, it can be easily determined in which preferred direction the intumescent material expands during swelling or foaming.

The said carrier layer, for its part, is expediently made of a heat-insulating material such as the fire protection material according to the invention, which has sufficient structural stability and the lowest possible thermal conductivity.

Optionally, it is intended that the intumescent material is arranged between an inner side of a case wall and the carrier layer, which is preferably according to the invention. As soon as due to an increased ambient temperature an increased heat input through the case wall into the interior of the case takes place and the intumescent material heats up above a threshold temperature, it expands and forms a thermal insulation layer directly adjacent to the inside of the case wall, which additionally reduces further heat transfer into the interior of the case. In addition, the expansion of the intumescent material as an endothermic reaction can lead to an additional cooling effect.

According to a design, the case wall has at least one opening through which the intumescent material can penetrate and exit the case in the event of temperature-related foaming. This enables the housing to have comparatively small dimensions during regular operation. In the event of excessive heat exposure, the intumescent material expands, escapes through the said at least one opening and forms a thermal insulation layer on the outside. This at least one opening is preferably several openings, which are arranged regularly or irregularly; for example, they can be holes with a diameter of a few millimetres. It is also possible to use a case which has a few comparatively large holes.

As an alternative or in addition to this, a thermal insulation layer with an intumescent material, preferably in accordance with the invention, may be provided on the inside of the case wall or in the interior of the case. This foams up when the threshold temperature is exceeded and forms a thermal insulation layer on the outside of the housing, which also reduces or delays the heating of the case wall. The intumescent material is able to completely enclose the housing, so that after foaming the housing is surrounded by the foamed thermal insulation layer. Since the intumescent material requires comparatively little space before foaming, a thin coating of the housing, which only minimally increases the external dimensions, can form a thick and effective thermal insulation if required.

According to a design, it is possible that a thermal insulation layer, preferably according to the invention, has a layer of a material which, when heated, carries out an endothermic reaction, thereby causing cooling.

If the data processing unit itself generates heat during normal operation, this heat must be removed in order to prevent the data processing unit from overheating during its intended use. It is therefore optionally provided that a heat transfer element is arranged in the case, which forms a heat-transferring connection of the data processing unit with a heat-conducting case interface in a case wall of the case, in order to be able to dissipate the heat generated by the data processing unit during operation via the heat transfer element. The heat transfer element can be, for example, a thin metal sheet or a metal foil, which enables efficient heat dissipation from the case. It is also conceivable that a heat-transferring fluid is circulated through the case or a heat exchanger is used for heat dissipation.

In order to prevent heat from the environment from being transferred into the case via the heat transfer element when the ambient temperature rises or rises excessively, which could cause the data processing unit to overheat and be damaged, a design is provided for the heat transfer element to have a separating device. This separating device becomes active in the event of excessive heat input to the data processing unit or excessive temperatures outside the case and separates the connection between the inside of the case and the environment.

For example, the separating device has an element that changes shape under the influence of heat, which at a corresponding temperature changes in such a way that the connection between the interior of the case and the environment is separated. This separation can be achieved, for example, by deformation or by a break at a predetermined breaking point.

Preferably, the data processing unit is covered with a moisture-proof coating, for example a lacquer coating of an electrically insulating plastic material, which protects the data processing unit against moisture, but also against dust and other contaminants. However, this function can also be provided by the fire protection material according to the invention.

Where the data processing unit consists of several components, such as a microprocessor and one or more memory units, arranged on a common printed circuit board, a moisture-proof coating may be applied directly to the printed circuit board and the components arranged thereon, for example by suitable dipping or spraying methods. By means of the moisture-proof coating, the data processing unit can be protected not only against splash water or small amounts of moisture, but also against water penetrating into the housing with a high water pressure, for example more than 10 bar or 20 bar.

The moisture-proof coating can, when using a previously described heat transfer element, also surround the heat transfer element at least in an area around the data processing unit and provide additional fixing and protection of the heat transfer element to the data processing unit.

A separate moisture-proof or waterproof covering or sealing of the housing is therefore not necessary, but can also or alternatively be used.

In an embodiment, the data processing unit has a storage device for digital data. Preferably, the storage device is provided with a solid-state drive. Semiconductor chips based on flash memory or SDRAM are known to be suitable for use as solid-state drives, which can store a very large amount of data in excess of 100 gigabytes in a comparatively small chip package. A data processing unit with at least one microprocessor and several semiconductor chips can be accommodated on a circuit board with dimensions of less than 50 mm×50 mm. A thermal insulation according to the invention, with which such a data processing unit is protected from damage even in the event of fire, can be accommodated in a case with a small useful volume and small external dimensions.

According to a design, the case is intended to have dimensions less than or equal to a standardized 3.5-inch case with dimensions less than or equal to 146 mm×102 mm×25 mm. The case may have a standardised shape so that the data processing unit located therein and protected by a thermal insulation device can be used in a data processing system instead of a standard hard disk, for example. It is also possible to replace a hot-swap hard disk during operation and to replace it with a data processing unit which is arranged in a case provided with the heat insulation device according to the invention and which allows a subsequent fire and fire protection upgrade of the data processing system.

Due to the small dimensions and the high data transfer rates which are possible with a data processing unit described above during normal operation, such a data processing unit in the case of the invention is also suitable for use as a tachograph and black box in autonomous vehicles.

It is currently assumed that a tachograph, which enables the seamless monitoring and logging of a vehicle's operation for about 24 hours, and in particular of a vehicle operated partially or completely autonomously, should be able to record and store a data volume of about 5 terabytes. Solid-state drives have been developed, which have a storage capacity of 6 terabytes and more with a small space requirement and also low heat generation during operation and are advantageously suited as a data processing unit in a case according to the invention for use as a black box for autonomously driven vehicles. Such a black box with sufficient protection against fire, water and vibrations for most possible accidents may be contained in a case which has only the external dimensions of a standardized 3.5-inch enclosure or is even smaller.

In addition to the cladding/covering of materials, the fire protection materials can also completely or partially replace the component to be covered. For example, it is possible to construct a door exclusively or partially from the fire protection materials.

Apart from the use in areas which are exposed to unplanned and spontaneously high temperatures (as in a fire) and due to their presence have a fire retarding and fire retardant effect, the fire protection materials are also more generally applicable in areas in which usually (high) temperature differences already exist and thermal insulation is desired. As examples for this, the metallurgy or the metal processing industry in general, as well as the insulation of furnaces in particular, should serve. Also the "usual" thermal insulation of buildings, such as houses, while at the same time maintaining the above-mentioned fire protection properties through fire protection materials is conceivable. Further fields of application are obvious for the person skilled in the art.

The fire protection material is either cut to size for the respective application or already produced in the desired form.

Generally usable forms of fire protection materials are obvious to the specialist and include, for example, slabs, cuboid bodies, such as bricks, concave or convex bodies which are hollow inside, for example, and can serve as cable conduits.

Due to the already described adhesive properties of the composition, it is also possible neither to cut a desired target body from the fire protection material nor to produce it directly from a mould, but to glue this target body together. This is of particular interest if the shape of the desired target body is "complex".

The size of fire protection materials (each dimension is independent of the other) is normally from a few centimetres to several meters.

Composite Materials

The fire protection material produced according to the invention can be used in the form of composite materials. Composite material, comprising such a fire protection material and at least one carrier material.

The composition in process step (1) or (1') has not only swelling properties but also adhesive properties. The composition is therefore particularly suitable for bonding materials.

Accordingly, the present invention also concerns composite materials comprising a composition as in process steps (1) or (1') and at least one carrier material, wherein the composition is either applied to the carrier material or the carrier material is impregnated with this composition. This is followed by process step (2) or (2') for producing the fire protection material. Due to the adhesive properties, a composite material is obtained in this case.

Accordingly, the present invention also concerns composite materials comprising a composition as in process step (1) or (1') and at least one carrier material, wherein the composition is either applied to the carrier material or the carrier material is applied with this composition. This is followed by the process step (2) or (2') for producing the fire protection material. Due to the adhesive properties, a composite material is obtained in this case.

The carrier material is selected from the group consisting of fleece materials, in particular fleece materials made of glass fibres, polyester, natural fibres, rayon/cellulose or polyamide; woven fabrics made of glass fibres or mixed fabrics; scrims made of glass fibres; mineral wool, in particular mineral wool made of glass or stone; cellulose materials such as paper materials and cardboard materials, in particular paper honeycombs, wood fibre boards or honeycomb structures; plastic materials; metal materials, such as metal foils and sheets, in particular aluminium foils and sheets or stainless steel foils and sheets; glass materials, such as glass foils and glass wool; cotton fabrics; wood materials and wood-based panels such as MDF, HDF and chipboard; Foams made of polyurethane, polystyrene, glass or stone foam, PVC or phenol; materials made of extruded polystyrene foam; materials made of polyethylene foam, polypropylene foam, polyurethane foam and polypropylene foam; films made of polypropylene, polyethylene, polyurethane or silicone and general decorative surfaces such as HPL or CPL. Other suitable materials are materials made of flax, jute, hemp and cellulose fibres and, in general, textile materials.

It is preferably selected from the group consisting of fleece materials; paper and cardboard materials, such as paper honeycomb; plastic materials; metal materials, such as metal foils, in particular aluminium foils; glass materials, such as glass foils and glass wool; cotton fabrics; wood materials; mineral wool; materials made of extruded polystyrene foam, polyurethane foam, polyethylene foam and polypropylene foam; materials made of jute, flax, hemp and cellulose fibres; and textile materials.

It is also possible to use composite structures (e.g. glass fabric/aluminium or HPL/glass fleece) as carrier material.

In addition, the carrier materials can be perforated, slashed or structured in other ways for certain applications.

Within the scope of the present invention, the carrier material can be impregnated with the swelling composition and subsequently, according to process step (2) or (2'), the composition can be converted into the fire protection material. Impregnation of the carrier material is possible by using an immersion bath which is filled with the composition and by immersing the carrier material in the immersion bath.

Impregnation of corresponding carrier materials, in particular paper or cardboard materials, such as paper or cardboard honeycombs, leads to penetration of the composition between the fibres of the carrier material, so that even cutting correspondingly impregnated carrier materials does not lead to a loss of the fire protection effect. Furthermore, impregnation of the composition into corresponding carrier materials can be improved by the use of surface-active agents. Process step (2) or (2') can be carried out before or after cutting the impregnated materials.

If paper honeycombs are impregnated with the composition, non-combustible composite materials are obtained after application of process step (2) or (2'), from which, for example, walls, ceilings or other construction elements can be manufactured.

The fire protection effect of these composite materials can be further enhanced by following measures:
1. The paper used for the paper honeycomb is perforated beforehand. This reduces the percentage of combustible material and the composition is better absorbed. In addition, the composition is also deposited in the perforated cavities, which increases its percentage.
2. The covering layers for the paper honeycombs are made of impregnated glass, paper or plastic fleece. These cover layers increase the mechanical stability of the paper honeycomb and also provide fire protection. The amount of fire protection compound applied can be varied according to requirements.
3. Subsequently, the process step (2) or (2') according to the invention is carried out.

Instead of fleece, cover layers of perforated paper and with fire protection composition perforated paper can also be used.

In addition, the top layers produced in this way can also be covered with aluminium foil, which improves heat reflection and reduces water vapour diffusion.

Sandwich Structure

A further object of the present invention is a composite body comprising a carrier material according to the above definition, which has been provided with the composition, and at least one further layer which is formed by an aluminium foil, a glass fleece or a paper or cardboard material and which is applied to the carrier material.

The carrier material can preferably be a paper or cardboard honeycomb.

The further layer can be formed for example by a perforated paper fleece or a perforated cardboard material or glass fleece.

This further layer, formed by a perforated paper fleece or a perforated cardboard material, may also preferably be impregnated with the composition.

After providing such a sandwich structure in process step (1) or (1'), a fire protection material is obtained after process step (2) or (2'), which has the structure described above. Composite bodies with such a structure are also referred to as sandwich structures in the context of the present invention.

These sandwich structures not only have excellent fire retardant properties, but due to the adhesive properties of the composition they are sufficiently bonded without the use of an additional adhesive.

Especially when using cardboard honeycombs as a second layer, the covering of the cardboard honeycombs with the fire protection material produced by the process according to the invention prevents the heat transfer by convection and at the same time (for example in case of fire) a cooling effect is achieved by evaporation of the water from the fire protection mass.

In case of fire, the resulting sandwich structures remain intact and individual layers will not be separated from the sandwich.

Inventive sandwich structures comprise the following structure:
(1) A first layer consisting of an aluminium foil, a glass mat, a paper or paperboard material or a composite thereof;
(2) a second layer of fleece material; paper material or cardboard material, such as a paper honeycomb; plastic material; metal material, such as a metal foil, in particular an aluminium foil; glass material, such as a glass foil or glass wool; cotton material, wood material or mineral wool material; materials made of polyethylene foam; materials made of extruded polystyrene foam; materials made of polyurethane foam; materials made of polypropylene foam; materials made of flax, jute, hemp and cellulose;
(3) a third layer consisting of an aluminium foil, a glass mat, a paper or cardboard material or a composite thereof;

whereby the composite material is constructed in such a way that the first layer is provided on one side of the second layer and the third layer is provided on the other side of the second layer and the fire protection material from the composition has been applied on one side or on both sides according to the method of the invention.

EXPERIMENTS

Viscosity Measurement and Viscosities of Water Glasses

The viscosities of the water glasses used were measured as follows:

TABLE 1

Details on the determination of viscosity
and viscosities of various water glasses.

| Water glass | Spindle | RPM | Measuring range | Temperature | Viscosity |
|---|---|---|---|---|---|
| Na-WG1 | L 3 | 100 | 47.50% | 20° C. | 569 mPa * s |
| Na-WG2 | L 2 | 100 | 51.90% | 20° C. | 156 mPa * s |
| K-WG1 | L 2 | 200 | 48.90% | 20° C. | 73 mPa * s |
| K-WG2 | L 2 | 200 | 26.60% | 20° C. | 39 mPa * s |

Definition of the Water Glasses Used

Na-WG1 is a sodium silicate glass which, in addition to the above viscosity, has a sodium silicate content of about 50% to a maximum of 100% and a density (at 20° C.) of about 1.5 g/mL. The pH value (100 g/L at 20° C.) is about 13.

Na-WG2 is a sodium silicate glass which, in addition to the above viscosity, has a sodium silicate content of about 25% to a maximum of 40% and a density (at 20° C.) of about 1.4 g/mL. The pH value (100 g/L at 20° C.) is about 11.

K-WG1 is a potassium water glass which, in addition to the above viscosity, has a density (at 20° C.) of about 1.3 g/mL. The pH value (100 g/L at 20° C.) is about 11.

K-WG2 is a potassium water glass which, in addition to the above viscosity, has a density (at 20° C.) of about 1.3 g/mL. The pH value (100 g/L at 20° C.) is about 11.

Definition of the Used Other Components (in the Experiments)

The component "Al(OH)$_3$ mixture" is a mixture of Al(OH)$_3$ with various other oxides, such as sodium oxide, iron oxide and silicon dioxide. Al(OH)$_3$ is the main component with over 99%.

The component "expanded granules A" are (surface-treated) hollow glass spheres whose material consists of >95% silicon dioxide and which start to soften at about 1300° C. (in the cluster). Expanded granulate A has a pH value of 5 to 8.

The component "expanded granulate B" is an expanded glass granulate with the following properties: grain size of 0.25 to 0.5 mm, bulk density of 340 (±30) kg/m$^3$, raw grain density of 700 (±80) kg/m$^3$, whereby the raw grain density was tested according to DIN V 18004 and calculated according to EN 1097-6, average grain strength of 2.6 N/mm2, whereby the grain strength was determined according to DIN EN 13055-1. The expanded granulate B consists (based on a sample dried at 105° C.) of about 70 to 75% SiO2, 10 to 15% Na$_2$O, 7 to 11% CaO, 0.5 to 5% Al$_2$O$_3$, 0 to 5% MgO and 0 to 4% K$_2$O. The "expanded granulate B" begins to soften at about 700° C. It has a pH value of 8 to 11.

The component "microcapsule A" is a dry, unexpanded microcapsule filled with propellant gas. They comprise about 20 to 30% of the propellant isobutane, about 1 to 5% magnesium hydroxide and about 60 to 80% of a copolymer. The average particle size is 10 to 16 μm and the density is ≤12 kg/m$^3$. The propellant gas is released in a temperature range of 80 to 95° C.

The component "microcapsule B" is a dry, non-expanded microcapsule filled with propellant gas. They comprise about 13% of a propellant gas, about 0 to 20% amorphous silica and about 60 to 90% of a copolymer. The average particle size is 10 to 16 μm and the density is ≤17 kg/m$^3$. The propellant gas is released in a temperature range of 94 to 99° C.

The component "microcapsule C" is a dry, unexpanded microcapsule filled with propellant gas. They contain about 15 to 20% of the propellant isopentane and over 75% of a copolymer. The average particle size is 10 to 16 μm and the density is ≤17 kg/m$^3$. The propellant gas is released in a temperature range from 123 to 133° C.

The component "microcapsule D" is a dry, unexpanded microcapsule filled with propellant gas. They contain about 15 to 20% of the propellant isopentane, over 60% of a copolymer and about 0 to 20% magnesium hydroxide. The average particle size is 28 to 38 μm and the density is ≤14 kg/m$^3$. The propellant gas is released in a temperature range of 122 to 132° C.

The component "copolymer dispersion A" is an aqueous copolymer dispersion based on vinyl acetate/vinyl ester. Emulsifiers and cellulose derivatives serve as stabilizers for the dispersion.

The component polyethylene fibre A is a fibre made of HD-PE.

The component "dispersant A" is a solution of a high molecular anionic copolymer in water.

The component "surfactant mixture A" is a medium viscous mixture of various polyglycol esters. The density of the mixture (at 20° C.) is about 1.0 g/mL, the dynamic viscosity (at 20° C., measured according to DIN EN ISO 3219) is about 120 mPas and the pH value (of 2% in distilled water) is about 6.5.

The component "marble powder A" is a marble powder with a mean particle diameter of 2.5 μm.

The component "marble powder B" is a marble powder with a mean particle diameter of 5 μm.

The component "marble powder C" is a marble powder with a mean particle diameter in a range of 12 μm to 15 μm.

The component vermiculite is expanded vermiculite. The main components of this aluminium magnesium iron silicate are (approx.) 43% to 46% SiO$_2$, 9% to 12% Al$_2$O$_3$, 7% to 9% Fe$_2$O$_3$, 1% to 3% CaO, 24% to 27% MgO and 4% to 6% K$_2$O. The particle size distribution is (each approx.): 50-75% of the product has a particle size smaller than 0.050 mm, 25-50% of the product has a particle size between 0.050 and 0.071 mm, 15-50% of the product has a particle size between 0.071 and 0.1 mm. The rest has larger grain sizes, whereby the proportion of product with grain sizes larger than 1 mm is at most (approx.) 1%.

The component vermiculite powder is a corresponding vermiculite powder. The particle size is smaller than 50 micrometres and the specific surface is about 2.6 m$^2$/g.

The component glass fibre is a glass fibre with the following chemical composition (approx.): 62-68% SiO2, 26-32% CaO+MgO, less than 1% other components.

The component 'polyurethane dispersion' is a non-ionic polyurethane system in water, the ratio of polyurethane to water being approximately 25 to 75. The polyurethane dispersion has a density (at 20° C.) of about 1.04 g/mL. The dynamic viscosity of the polyurethane dispersion is about 25000 mPas (according to DIN EN ISO 3219) and the pH value (2% in distilled water) is about 6.5.

Experiments

The following experiments demonstrate the advantage of the method according to the invention.

1—Component System

The following experiments relate to processes in which the expansion of the microcapsules takes place through the action of temperature.

Test Group Water Resistance

The increase in water resistance when potassium water glass is added to sodium silicate or when potassium water glass is used exclusively is illustrated by the following experiments (Tables 2A and 2B):

The proportions of the individual components were identical in the experiments, or when several water glasses (1-WR-3 and 1-WR-5 to 1-WR-13) were used, the mass sum of the water glasses used was identical to the respective water glass of the other experiments. Therefore a direct comparison of the resulting fire protection materials is possible.

The ratio of potassium water glass to sodium silicate glass was gradually increased in this test series from 0%, i.e. no potassium water glass present (in the experiments 1-WR-1 and 1-WR-2), to 100%, i.e. no sodium silicate glass present (in the experiment 1-WR-4).

TABLE 2A

Water resistance of water glasses (* = non-inventive tests).

| Component | 1-WR-1* | 1-WR-2* | 1-WR-3 | 1-WR-5 | 1-WR-6 | 1-WR-7 | 1-WR-8 |
|---|---|---|---|---|---|---|---|
| Na—Si1 | 64 | — | — | — | — | — | — |
| Na—Si2 | — | 64 | 32 | 28.2 | 25.6 | 22.4 | 19.2 |
| K-WG1 | — | — | 32 | 35.2 | 38.4 | 41.6 | 44.8 |
| Al(OH)$_3$ mixture | 10.4 | 10.4 | 10.4 | 10.4 | 10.4 | 10.4 | 10.4 |
| Microcapsule A | 6.4 | 6.4 | 6.4 | 6.4 | 6.4 | 6.4 | 6.4 |
| Expanded granulate A | 32 | 32 | 32 | 32 | 32 | 32 | 32 |
| Copolymer Dispersion | 4.16 | 4.16 | 4.16 | 4.16 | 4.16 | 4.16 | 4.16 |
| Mass in g: | 116.96 | 116.96 | 116.96 | 116.96 | 116.96 | 116.96 | 116.96 |
| Amount potassium water glass in relation to total formulation in %: | — | — | 27.36 | 30.10 | 32.83 | 35.57 | 38.30 |
| Amount potassium water glass in relation to total binding agent in %: | — | — | 50 | 55 | 60 | 65 | 70 |
| Water resistance: | 5 | 5 | 4 | 4 | 3-4 | 3-4 | 3-4 |

TABLE 2B

Water resistance of water glasses (* = non-inventive tests).

| Component | 1-WR-9 | 1-WR-10 | 1-WR-11 | 1-WR-12 | 1-WR-13 | 1-WR-4* |
|---|---|---|---|---|---|---|
| Na—Si1 | — | — | — | — | — | — |
| Na—Si2 | 16 | 12.8 | 9.6 | 6.4 | 3.2 | — |
| K-WG1 | 48 | 51.2 | 54.4 | 57.6 | 60.8 | 64 |
| Al(OH)$_3$ mixture | 10.4 | 10.4 | 10.4 | 10.4 | 10.4 | 10.4 |
| Microcapsule A | 6.4 | 6.4 | 6.4 | 6.4 | 6.4 | 6.4 |
| Expanded granulate A | 32 | 32 | 32 | 32 | 32 | 32 |
| Copolymer Dispersion | 4.16 | 4.16 | 4.16 | 4.16 | 4.16 | 4.16 |
| Mass in g: | 116.96 | 116.96 | 116.96 | 116.96 | 116.96 | 116.96 |
| Amount potassium water glass in relation to total formulation in %: | 41.04 | 43.78 | 46.51 | 49.25 | 51.98 | 54.72 |
| Amount potassium water glass in relation to total binding agent in %: | 75 | 80 | 85 | 90 | 95 | 100 |
| Water resistance: | 3-4 | 2 | 2 | 2 | 2 | 2 |

The composition of the respective tests was provided according to the mass ratios of the components given in the table and process step (2') was carried out thermally at a furnace temperature of 86° C.

The mouldings obtained were tested for water resistance. The evaluation was carried out on a scale from 1 (very good) to 6 (insufficient).

The water resistance improved (compared to pure sodium silicate glass in 1-WR-1 and 1-WR-2) with poor water resistance when the potassium water glass content was increased. This improvement can be divided into three groups:

Group 1: When using 50% to 55% potassium water glass (1-WR-3 and 1-WR-5) a slight improvement is achieved, the resulting water resistance is sufficient.

Group 2: A further improvement in water resistance was observed when using 60% to 75% potassium water glass. The water resistance is in the range between satisfactory and sufficient.

Group 3: When using 80% to 100% potassium water glass (compared to all other groups) a significant improvement of water resistance was observed. The water resistance in this group is good.

These experiments clearly show the increased water resistance of the mouldings increase the potassium water glass content in the composition. The use of at least 50% potassium water glass (based on the sum of the water glasses) is preferred, further preferred is the use of at least 60% potassium water glass, even further preferred is the use of more than 75% potassium water glass.

Test Group Temperature

The experiments in the following tables (Table 3, 4, 5a, 5b and 6) show the influence of microcapsules, water glass and temperature on the resulting moulding. In the experiments summarized in these tables, the respective composition (as listed) was provided (process step (1')) and the consistency assessed. The compositions were then hardened in a ring (Ø4.5 cm) at the temperatures listed (process step (2')).

The temperature of the experiments in Table 3 is in accordance with the invention and amounts to 85° C., the temperature in the tables (4, 5a and 5b) is not in accordance with the invention (temperatures of greater than or equal to 90° C.). Table 6 contains comparative tests of a composition at different temperatures.

After the process step (2') the evaluation of the obtained mouldings is carried out. The evaluation included the assessment of the structure of the bottom area, the remaining structure, the colour, the swelling behaviour (which was carried out via the foam height, whereby a foam height of more than approx. 2 cm was evaluated as "strongly swelled") and the consistency. The consistency was divided into powdery, brittle, granularly and soft.

TABLE 3

Process at 85° C. and characterisation of the mouldings obtained (* = experiments not according to the invention).

|  | 1-Temp-1 | 1-Temp-2 (*) |
|---|---|---|
| K-WG1 | 8 | — |
| Na-WG2 | — | 8 |
| Al(OH)$_3$ mixture | 1 | 1 |
| Microcapsule A | 0.8 | 0.8 |
| Expanded granulate B | 2 | 2 |
| Consistency (before step (2')) | liquid, granular | fluid |
| Reaction temperature | 85° C. | 85° C. |
| Bottom structure | smooth | smooth |
| Remaining structure | good uniform structure | good uniform structure |
| Colour | creme white | creme white |
| Foam height swelling behaviour | ca. 2.4 cm strongly swollen | ca. 2.2 cm strongly swollen |
| Consistency (after step (2')) | non-powdery | light powdery |

TABLE 4

Comparative experiments (* = experiments not according to the invention) at 97° C. and characterization of the obtained mouldings.

|  | 1-CE-Temp-1(*) | 1-CE-Temp-2(*) | 1-CE-Temp-3(*) |
|---|---|---|---|
| Na-WG1 | — | — | 8 |
| Na-WG2 | — | 8 | — |
| K-WG1 | 8 | — | — |
| Al(OH)$_3$ mixture | 1 | 1 | 1 |
| Microcapsule B | 0.8 | 0.8 | 0.8 |
| Expanded granulate B | 2 | 2 | 2 |
| Consistency (before step (2')) | liquid, granular | fluid | viscous |
| Reaction temperature | 97° C. | 97° C. | 97° C. |
| Bottom structure | smooth | hollow | smooth |
| Remaining structure | internally hollow | large rupture in the middle | compact structure |
| Colour | faint reddish | faint reddish | faint reddish |
| Foam height swelling behaviour | ca. 3.3 cm strongly swollen | ca. 3.1 cm strongly swollen | ca. 1.7 cm little swollen |
| Consistency (after step (2')) | non-powdery | non-powdery | non-powdery |

TABLE 5a

Comparative experiments (* = experiments not according to the invention) at 125° C. and characterisation of the mouldings obtained.

|  | 1-CE-Temp-4(*) | 1-CE-Temp-5(*) | 1-CE-Temp-6(*) |
|---|---|---|---|
| Na-WG2 | — | — | 8 |
| K-WG1 | 8 | 8 | — |
| Al(OH)$_3$ mixture | 1 | 1 | 1 |
| Microcapsule C | 0.8 | — | 0.8 |
| Microcapsule D | — | 0.8 | — |
| Expanded granulate B | 2 | 2 | 2 |
| Consistency (before step (2')) | liquid, granular | liquid, granular | fluid |
| Reaction temperature | 125° C. | 125° C. | 125° C. |
| Bottom structure | smooth | smooth | smooth |
| Remaining structure | good uniform structure | great rupture at the top | great rupture in the middle |
| Colour | strong red colour | below reddish, creme white at top | faint red colour |
| Foam height swelling behaviour | ca. 1.5 cm little swollen | ca. 3 cm strongly swollen | ca. 1.6 cm strongly swollen |
| Consistency (after step (2')) | non-powdery | powdery | Light powdery |

TABLE 5b

Comparative experiments (* = experiments not according to the invention) at 125° C. and characterisation of the mouldings obtained.

|  | 1-CE-Temp-7(*) | 1-CE-Temp-8(*) | 1-CE-Temp-9(*) |
|---|---|---|---|
| Na-WG1 | — | 8 | 8 |
| Na-WG2 | 8 | — | — |
| Al(OH)$_3$ mixture | 1 | 1 | 1 |
| Microcapsule C | — | 0.8 | — |
| Microcapsule D | 0.8 | — | 0.8 |
| Expanded granulate B | 2 | 2 | 2 |
| Consistency (before step (2')) | fluid | viscous | viscous |

TABLE 5b-continued

Comparative experiments (* = experiments not according to the invention) at 125° C. and characterisation of the mouldings obtained.

|  | 1-CE-Temp-7(*) | 1-CE-Temp-8(*) | 1-CE-Temp-9(*) |
|---|---|---|---|
| Reaction temperature | 125° C. | 125° C. | 125° C. |
| Bottom structure | smooth | smooth | hollow |
| Remaining structure | large rupture in the middle | collapsed foam | good uniform structure |

While the invention-related experiment 1-Temp-1 (Table 3) results in a product with ideal characteristics, mouldings from the comparative experiments (Tables 3, 4, 5a and 5b) are not ideal and exhibit various defects in one or more of the points bottom structure, remaining structure, swelling behaviour and consistency. The two tests in Table 3 differ from each other only in the type of glass used and show that the use of a potassium water glass results in a better consistency of the moulding compared to a sodium silicate glass.

The significance of temperature is further illustrated by the following experiments. In these experiments, the experiment is performed with the same composition used in the "1-Temp-1" experiment at different temperatures:

TABLE 6

Experiments with identical composition at different temperatures and characterization of the obtained mouldings (* = experiments not according to the invention).

| Component | 1-Temp-1 | 1-Temp-1A(*) | 1-Temp-1B(*) | 1-Temp-1C(*) |
|---|---|---|---|---|
| K-WG1 | 8 | 8 | 8 | 8 |
| $Al(OH)_3$ mixture | 1 | 1 | 1 | 1 |
| Microcapsule A | 0.8 | 0.8 | 0.8 | 0.8 |
| Expanded granulate B | 2 | 2 | 2 | 2 |
| Consistency (before step (2')) | liquid, granular | liquid, granular | liquid, granular | liquid, granular |
| Reaction temperature | 85° C. | 90° C. | 100-106° C. | 110° C. |
| Bottom structure | smooth | rippled | smooth | rippled |
| Remaining structure | good uniform structure | hollow at the bottom | completely hollow | completely hollow |
| Colour | creme white | creme white | creme white | creme white |
| Foam height | approx. 2.4 cm | irregular, one side 2.2 cm, another side 0.7 cm | 2.5 cm | 3.0 cm |
| swelling behaviour | strongly swollen | irregularly swollen | strongly swollen | strongly swollen |
| Consistency (after step (2')) | non-powdery | soft, crumbly | brittle | soft, crumbly |

TABLE 5b-continued

Comparative experiments (* = experiments not according to the invention) at 125° C. and characterisation of the mouldings obtained.

|  | 1-CE-Temp-7(*) | 1-CE-Temp-8(*) | 1-CE-Temp-9(*) |
|---|---|---|---|
| Colour | below reddish, creme white at top | strong red colour | below reddish, creme white at top |
| Foam height | ca. 2.5 cm | ca. 1.0 cm | ca. 1.5 cm |
| swelling behaviour | strongly swollen | approx, strongly swollen, but collapsed | little swollen |
| Consistency (after step (2')) | powdery | non-powdery | non-powdery |

Ideally, the product should be highly swollen, with a smooth bottom area and a residual structure that is good and uniform. Further preferred is the moulding not powdery or at most slightly powdery. Normally a creamy white colour of the moulded body is preferred.

These comparative experiments clearly show that the moulding obtained by the method according to the invention (1-Temp-1) has ideal properties.

An increase of the temperature in process step (2') to temperatures not in accordance with the invention of 90° C. (1-Temp-1A), 100-106° C. (1-Temp-1B) or 110° C. (1-Temp-1C) results in a deterioration of the properties of the mouldings obtained.

2—Component System

The following experiments deal with processes in which the polymer material of the shell of the microcapsules is broken up by the addition of an agent.

In preliminary experiments it was shown that microcapsules with different solvents can be broken open and release gas. Initially, good combinations were determined. For this purpose, different microcapsules with different solvents (each in the same mass ratio) were combined with each other and the reaction was evaluated or the absence of a reaction was noted (see table below).

TABLE 7

Reaction between microcapsules and solvents.

| Component | 2-M-1 | 2-M-2 | 2-M-3 | 2-M-4 | 2-M-5 | 2-M-6 | 2-M-7 |
|---|---|---|---|---|---|---|---|
| Microcapsule A | X | X | — | — | — | — | — |
| Microcapsule B | — | — | X | X | X | — | — |
| Microcapsule C | — | — | — | — | — | X | — |
| Microcapsule D | — | — | — | — | — | — | X |
| Propylencarbonate S | X | — | X | — | — | X | X |
| Acetone | — | — | — | X | — | — | — |
| Turpentine substitute | — | — | — | — | X | — | — |
| Propylencarbonate/Water (2.4 g/7.6 g) | — | X | — | — | — | — | — |
| Reaction | +++ (after approx. 30 sec.) | +++ (immediately) | ++ | + | + | — | — |

In the above table, an "X" indicates the presence of the corresponding component and an "–" indicates the absence of this component. The reaction (the release of gas from the microcapsule) was divided into excellent reactions (+++), good reactions (++), minimal reaction (+) and no reaction (–). In case of excellent reactions, the start of the reaction (after the components were combined) was also noted.

The experiments 2-M-1 and 2-M-2 resulted in an excellent reaction. Due to these preliminary experiments, the subsequent experiments, which use a component to break open the microcapsules, focused on combinations of microcapsule A and propylene carbonate.

Inventive examples are listed in the following table.

TABLE 8

Experiments to break open the microcapsules with an agent.

| Ingredient | A | B | C |
|---|---|---|---|
| *Component 1* | | | |
| Na-WG1 | 80 | — | — |
| Na-WG2 | 14 | — | — |
| K-WG1 | — | 16 | 16 |
| Al(OH)$_3$ mixture | 4 | 0.8 | 0.8 |
| Polyethylene fiber A | 0.9 | 0.18 | 0.18 |
| Microcapsule A | 4 | 0.4 | 0.1 |
| Expanded granulate B | 2.4 | — | — |
| Vermiculite | 1 | 0.6 | 0.6 |
| Vermiculite Powder | 5 | — | — |
| Density: | 1.35 g/cm$^3$ | 1.21 g/cm$^3$ | 1.13 g/cm$^3$ |
| Volume Used [mL] | 10 | 10 | 10 |
| *Component 2* | | | |
| Propylene carbonate S | 18 | 18 | 18 |
| Dispersing agents A | 0.0449 | — | — |
| Surfactant mixture A | 0.1403 | 0.1144 | 0.126 |
| Marble powder A | 19 | 19 | 4 |
| Vermiculite | — | 1.72 | — |
| Marble powder B | — | — | 11 |
| Consistency: | liquid | thixotropic, creamy | creamy, thixotropic |
| Density: | 1.61 g/cm$^3$ | 1.65 g/cm$^3$ | 1.61 g/cm$^3$ |
| Volume Used [mL] | 1 | 1 | 1 |
| Miscibility of the components | ++ | ++ | ++ |
| Start of the reaction | approx. 1 min. | ≥1 min. | ≥2 min. |

The ingredients of component 1 were presented in the ratios listed above and the density was determined. The ingredients of component 2 were presented in another container and the density was determined as well as the consistency assessed. Afterwards, the respective components (in the indicated volume ratio, 10 mL to 1 mL) were combined and mixed. The miscibility of the components was assessed and the start of the reaction—i.e. the beginning of the gas release—was determined.

In all cases the components are well miscible and the reaction starts after approx. 1 min. (mixture A), ≥1 min (mixture B) or ≥2 min (mixture C).

Based on these preliminary tests, solid fire protection materials were produced (see tables below):

TABLE 9a

Experiments according to the invention for the production of fire protection materials.

| Ingredients/Characteristic | 2-1 | 2-2 | 2-3 | 2-4 |
|---|---|---|---|---|
| *Component 1* | | | | |
| Na-WG1 | 16 | 16 | 16 | 16 |
| Na-WG2 | 2.7 | 2.7 | 2.7 | 2.7 |
| Al(OH)$_3$ mixture | 0.8 | 0.8 | 0.8 | 0.8 |
| Polyethylene fiber A | 0.18 | 0.18 | 0.18 | 0.18 |
| Micrcapsule A | 0.6 | 0.6 | 0.6 | 0.6 |
| Vermiculite | 0.6 | 0.6 | 0.6 | 0.6 |
| Copolymer dispersion A | — | 1.02 | — | 1.02 |
| Glass fiber | — | — | 0.129 | 0.129 |
| Density [g/cm$^3$] | 1.34 | 1.43 | 1.47 | 1.44 |
| Volume Used [mL] | 5 | 5 | 5 | 5 |
| *Component 2* | | | | |
| Polyurethane dispersion/Water, 1/1 | 6 | 6 | 6 | 6 |
| Surfactant mixture A | 0.2 | 0.2 | 0.2 | 0.2 |
| Propylene carbonate, Jeffsol | 10 | 10 | 10 | 10 |
| Marble powder C | 6 | 6 | 6 | 6 |
| Marble powder A | 6 | 6 | 6 | 6 |
| Density [g/cm$^3$] | 1.45 | 1.45 | 1.45 | 1.45 |
| Volume Used [mL] | 1 | 1 | 1 | 1 |
| *Mixture of component 1 and 2* | | | | |
| Consistency of the mixture | well flowing | well flowing | well flowing | slightly viscous |
| Start of reaction [in minutes], approx. | 3 | 2.5 | 2.5 | 2 |

TABLE 9a-continued

Experiments according to the invention for the production of fire protection materials.

| Ingredients/Characteristic | Mixture | | | |
|---|---|---|---|---|
| | 2-1 | 2-2 | 2-3 | 2-4 |
| Swelling time: | 10-12 min | 10-12 min | 10-12 min | 10-12 min |
| Structure | | very good and uniform | | |

TABLE 9b

Experiments according to the invention for the production of fire protection materials.

| Ingredients/Characteristic | Mixture | | | |
|---|---|---|---|---|
| | 2-5 | 2-6 | 2-7 | 2-8 |
| Component 1 | | | | |
| Na-WG1 | 16 | 16 | 16 | 16 |
| Na-WG2 | 2.7 | 2.7 | 2.7 | 2.7 |
| Al(OH)$_3$ mixture | 0.8 | 0.8 | 0.8 | 0.8 |
| Polyethylene fiber A | 0.18 | 0.18 | 0.18 | 0.18 |
| Micrcapsule A | 0.4 | 0.4 | 0.6 | 0.5 |
| Vermiculite | — | — | — | — |
| Copolymer dispersion A | 1.02 | 1.02 | 1.02 | 1.02 |
| Glass fiber | — | 0.129 | 0.129 | 0.129 |
| Density [g/cm$^3$] | 1.43 | 1.41 | 1.41 | 1.42 |
| Volume Used [mL] | 5 | 5 | 5 | 5 |
| Component 2 | | | | |
| Polyurethane dispersion/Water, 1/1 | 6 | 6 | 6 | 6 |
| Surfactant mixture A | 0.2 | 0.2 | 0.2 | 0.2 |
| Propylene carbonate, Jeffsol | 10 | 10 | 10 | 10 |
| Marble powder C | 6 | 6 | 6 | 6 |
| Marble powder A | 6 | 6 | 6 | 6 |
| Density [g/cm$^3$] | 1.45 g/cm$^3$ | 1.45 g/cm$^3$ | 1.45 g/cm$^3$ | 1.45 g/cm$^3$ |
| Used Volume [mL] | 1 | 1 | 1 | 1 |
| Mixture of component 1 and 2 | | | | |
| Consistency of the mixture | well flowing | well flowing | foamy, fluent | well flowing |
| Start of reaction [in minutes], approx. | 3 | 3 | 3 | 3 |
| Swelling time, approx.: | 10-12 min | 10-12 min | 10-12 min | 10-12 min |
| Structure | | Very good and uniform | | |

Component 1 was a mixture of two different sodium silicate glasses with microcapsules. In addition, component 1 contained different additives, depending on the mixture. The density of component 1 was determined in each case and is listed.

The ingredients of component 2 are identical in these experiments. Component 2 contained, among other things, propylene carbonate, which serves to break open the shell material of the microcapsules. The density of component 2 was determined and is listed in the table.

Afterwards component 1 and component 2 were mixed in a constant volume ratio (5 mL to 1 mL) at room temperature. The consistency of the mixture was evaluated, the time to the start of the reaction and the expansion time (reaction duration) were measured. The structure obtained was then evaluated.

The consistency of the mixture was liquid in all cases, with the mixture 2-4 being slightly viscous. The start of the reaction in all mixtures was between about 2 to about 3 minutes after mixing the two components and the reaction time was about 10 to 12 minutes. In all cases, the structure of the resulting moulding was evaluated as very good and uniform.

In a further series of experiments, four of the mixtures defined above were scaled up to fill a cavity with the dimensions 10 cm*10 cm*2.5 cm (=250 cm$^3$) and the resulting fire protection panels were then evaluated.

The constituents of components 1 and 2 as well as the corresponding densities are listed in the tables above.

TABLE 10

Experiments according to invention for the production of fire protection materials.

| | Mixture | | | |
|---|---|---|---|---|
| | 2-2-G | 2-4-G | 2-6-G | 2-8-G |
| Component 1 | see component 1 in | see component 1 in | see component 1 in | see component 1 in |

TABLE 10-continued

Experiments according to invention for the production of fire protection materials.

| | Mixture | | | |
|---|---|---|---|---|
| | 2-2-G | 2-4-G | 2-6-G | 2-8-G |
| | mixture 2-2 | mixture 2-4 | mixture 2-6 | mixture 2-8 |
| Mass Component 1 [g] | 111.0 | 116.0 | 129.7 | 130.6 |
| Component 2 | see component 2 in mixture 2-2 | see component 2 in mixture 2-4 | s see component 2 in mixture 2-6 | see component 2 in mixture 2-8 |
| Component 2 [g] | 22.5 | 23.4 | 26.8 | 26.8 |
| Component 1 [mL] | 77.6 | 80.6 | 92.0 | 92.0 |
| Component 2 [mL] | 15.5 | 16.1 | 18.5 | 18.5 |
| Volume ratio | 5.0 | 5.0 | 5.0 | 5.0 |
| | Mixture of the Component 1 and 2 | | | |
| Consistency of the mixture | well flowing | well flowing | well flowing | well flowing |
| Start of reaction [in minutes], approx. | 2 | 2 | 3 | 3 |
| Swelling time, approx.: | 30 | 30 | 30 | 20 |
| Structure | | very good and uniform | | |
| Consistency of the mixture | | no structural changes | | |

Analogous to the series of experiments with the mixtures 2-1 to 2-8, in the experiments 2-2-G, 2-4-G, 2-6-G and 2-8-G a component 1 was also mixed with a component 2 in a volume ratio of 5 to 1. Component 1 comprises a water glass and gas-filled microcapsules, component 2 comprises the agent for breaking up the shell of the microcapsules (propylene carbonate).

After the two components were combined, the consistency of the mixture was evaluated, the time until the start of the reaction and the swelling time (reaction duration) were measured. The structure obtained was then evaluated.

The consistency of the mixture was liquid in all cases. While mixture 2-4 was evaluated as slightly viscous, the analogue mixture 2-4-G was evaluated as well liquid. The reaction started at between 2 and 3 minutes, whereas the reaction time was between 20 and 30 minutes. The relatively longer reaction time between the mixtures 2-2-G, 2-4-G, 2-6-G, 2-8-G and the analogous mixtures 2-2, 2-4, 2-6 and 2-8 is probably due to the fact that the first-mentioned mixtures are upscales of the second-mentioned mixtures. Accordingly, it is easier to determine a reaction in the upscaled mixtures; that is, in the small-scale reactions the reaction is simply no longer optically perceptible after the approx. 12 minutes listed there.

In all cases a very good and uniform structure was obtained.

The four moulded parts were then stored at room temperature and the structure was evaluated. After storage over one night, the structure was still very good and uniform and the volume was virtually unchanged. After several days of storage at room temperature, a slight decrease in volume of the mouldings was observed. After three days of storage at room temperature, the mouldings obtained from mixture 2-2-G were also stored in the oven at 96° C., with a considerable volume decrease observed.

The invention claimed is:

1. A process for producing a solid fire protection material, the process comprising:
   (1) providing a composition comprising at least one water glass and at least one propellant-provided microcapsule having a propellant-provided core and a polymer material as a shell, wherein the microcapsules comprise at least 20 wt. % propellant, based on dry weight; and
   (2) contacting the microcapsules with (a) a swelling agent comprising propylene carbonate or (b) a shell breaking agent comprising propylene carbonate in order to swell the microcapsules and/or break the polymer material of the shell of the microcapsules.

2. The process according to claim 1, wherein the mass ratio between the at least one water glass and the at least one microcapsule provided with the propellant is from 5.0 to 30.0.

3. The process according to claim 1, wherein the polymer material is selected from the group consisting of copolymers, copolymers of acrylonitrile, methacrylate and/or acrylate, vinylidene chloride copolymers and vinylidene chloride-acrylonitrile copolymers.

4. The process according to claim 1, wherein the at least one water glass comprises at least one potassium water glass.

5. The process according to claim 1, wherein a propellant release of the composition takes place after the addition of a shell-breaking agent in a timeframe of 20 seconds to 20 minutes.

6. The process according to claim 1, wherein the composition further comprises at least one of (a) at least one component supporting the ceramization of the composition at elevated temperatures; and (b) at least one organic fibre.

7. The process according to claim 6, wherein the at least one component that supports the ceramization at elevated temperatures is present and is selected from the group consisting of mineral additives, aluminium hydroxide, filter dust, fly ash, ceramic hollow spheres, hollow glass spheres, foam glass granules, slate flour, quartz flour, mica, wollastonite, calcium carbonates, kaolin, vermiculite and ettringite.

8. The process according to claim 6, wherein the at least one organic fibre is present and is selected from the group consisting of polyalkylene fibres, polyethylene fibres, polypropylene fibres; acrylic fibres: aramid fibres; polyamide fibres, polyhexamethylene diadipamide fibres, polycaprolactam fibres, aromatic polyamide fibres, partially aromatic polyamide fibres; partially aromatic polyester fibres, and wholly aromatic polyester fibres.

9. The process according to claim 1, wherein the solid fire protection material is in the shape of a fire protection panel.

10. The process according to claim 1, wherein the composition further comprises at least one of:
   (1) at least one component which leads to hardening and/or binding of the composition;
   (2) at least one component which has a moisture-retaining and/or hygroscopic property; and
   (3) at least one silicic acid.

11. The process according to claim 1, wherein the fire protection material obtained has a density of less than 0.6 g/cm$^3$.

12. The process according to claim 1, wherein the propellant comprises a propellant gas selected from the group consisting of hydrocarbons, methane, ethane, propane, n-butane, isobutane, pentanes, n-pentane, iso-pentane, neopentane; chlorofluorocarbons, trichlorofluoromethane, dichlorodifluoromethane; dimethyl ether; carbon dioxide, nitrogen, air, and mixtures thereof.

13. A composite material, the composite material comprising:
   the fire protection material obtained according to claim 1, and
   at least one carrier material.

14. The composite material according to claim 13, wherein the at least one carrier material is selected from the group consisting of non-woven materials; paper materials and cardboard materials, paper honeycombs; plastic materials; metal materials, metal foils, aluminium foils; glass materials, glass foils, glass wool; cotton fabrics; wood materials; mineral wool; materials of extruded polystyrene foam, polyurethane foam, polyethylene foam and polypropylene foam; materials of jute, flax, hemp and cellulose fibres; and textile materials.

15. The composite material according to claim 13, wherein the fire protection material is in the form of plates, cuboidal bodies, bricks, concave or convex bodies or tubular bodies.

16. The composite material according to claim 13, further comprising at least one layer applied to the at least one carrier material.

17. The composite material according to claim 16, wherein the at least one layer is selected from the group consisting of an aluminium foil, a glass fleece, a paper, and cardboard material.

18. A composite material, the composite material comprising:
   (1) a first layer selected from the group consisting of an aluminium foil, a glass fleece, a paper, a cardboard material, and a composite thereof;
   (2) a second layer selected from the group consisting of fleece materials; paper materials and cardboard materials, paper honeycomb; plastic materials; metal materials, metal foils, aluminium foils; glass materials, glass foils and glass wool; cotton fabrics; wood materials; mineral wool; materials made of extruded polystyrene foam, polyurethane foam, polyethylene foam and polypropylene foam; materials made of jute, flax, hemp and cellulose fibres; and textile materials; and
   (3) a third layer selected from the group consisting of an aluminium foil, a glass fleece, a paper, a cardboard material, and a composite thereof;
wherein the composite material is constructed such that that the first layer is provided on a first side of the second layer and the third layer is provided on a second side of the second layer and the fire protection material obtained according claim 16 is provided on one or both sides of the second layer.

19. A fire protection material, the fire protection material comprising:
   the composition according to (1) or (1') of claim 1, and
   at least one carrier material,
   wherein the composition is either applied to the at least one carrier material, or the at least one carrier material is impregnated with the composition.

20. A method of protecting from fire or heat a surface, structure or object, selected from the group consisting of doors, walls, floors, ceilings, openings, penetrations, tunnels, tubes, ships, vehicles, wagons, containers, cables, electronics, personal protective clothing, furnaces, the method comprising applying to the surface structure or object, fire protection material of claim 1.

21. The process of claim 1, wherein swelling the microcapsules and/or breaking the polymer material of the shell of the microcapsules by the addition of propylene carbonate is effected at ambient temperature, without the application of heat.

22. The process of claim 1, wherein one sodium silicate glass is present, and wherein a weight ratio of $SiO_2$ to $Na_2O$ is within the range of 2.3 to 3.8.

23. The process of claim 22, wherein a density of the solid fire protection material is within the range of 1300 to 1600 kg/m$^3$.

24. The process of claim 22, wherein a water content of the solid fire protection material is within the range of 50 to 70 wt. %.

25. The process of claim 1, wherein the composition comprises at least two different sodium silicate glasses, the first sodium silicate glass having a viscosity of 1000 to 2400 mPa*s (20° C.) and the second sodium silicate glass having a viscosity of 75 to 250 mPa*s (20° C.).

26. The process of claim 25, wherein the first sodium silicate glass has at least one other of the following properties:
   (1) weight ratio of $SO_2$ to $Na_2O$ within the range of 2.3 to 2.6; and/or
   (2) density within the range of 1500 to 1600 kg/m$^3$; and/or
   (3) water content within the range of 50 to 55 wt. %.

27. The process of claim 25, wherein the second sodium silicate glass has at least one of the following characteristics:
   (1) weight ratio of $SiO_2$ to $Na_2O$, within the range of 2.8 to 3.8; and/or
   (2) density within the range of 1300 to 1500 kg/m$^3$.

* * * * *